United States Patent [19]

Pruett

[11] 4,266,402
[45] May 12, 1981

[54] RECIRCULATING SUBMERSIBLE TURBINE

[76] Inventor: Robert L. Pruett, Rte. 2, Box 69, Gardnerville, Nev. 89410

[21] Appl. No.: 38,602

[22] Filed: May 14, 1979

Related U.S. Application Data

[63] Continuation-in-part of Ser. No. 857,635, Dec. 5, 1977, Pat. No. 4,170,114.

[51] Int. Cl.³ ............................................. F03B 13/10
[52] U.S. Cl. ..................................................... 60/496
[58] Field of Search ......................................... 60/496

[56] References Cited

U.S. PATENT DOCUMENTS

| 190,923 | 5/1877 | Sparrow | 60/496 |
|---------|--------|---------|--------|
| 211,143 | 1/1879 | Fogarty | 60/496 |
| 650,063 | 5/1900 | Kersten | 60/496 |
| 3,715,885 | 2/1973 | Schur | 60/496 |
| 4,170,114 | 10/1979 | Pruett | 60/496 |

Primary Examiner—Allen M. Ostrager
Attorney, Agent, or Firm—Townsend and Townsend

[57] ABSTRACT

A turbine wheel is encased in a closely fitting cylindrical housing filled with water. The circumference of the wheel is fitted with a plurality of chambers defined by axially extending vanes, each of which may have a radially flat portion tending to propel water tangentially following the direction of rotation of the wheel. Each chamber communicates to a respective radial conduit, and through the conduit to a central manifold. Gas is supplied at the manifold, so rather than being injected from outside the wheel, the gas is injected into the chambers from a point radially inward of the chamber volume. Water displaced downwardly out of the bottom chambers is diverted into a bypass conduit running outside the closely fitting housing and travels upwardly to be reintroduced into the chambers as they near the top dead center position. The water is preferably introduced over a fraction of the chambers' axial dimension so that the air may be quickly displaced to the side (axially).

7 Claims, 9 Drawing Figures

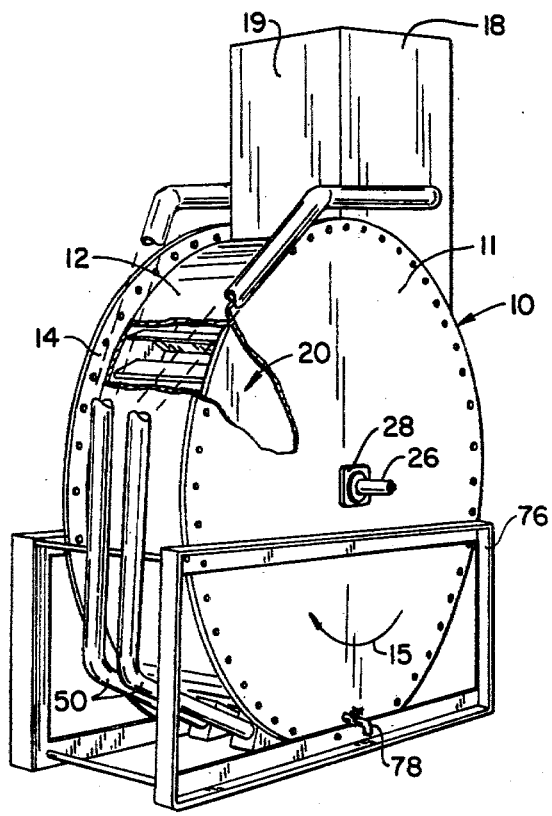
FIG._1.
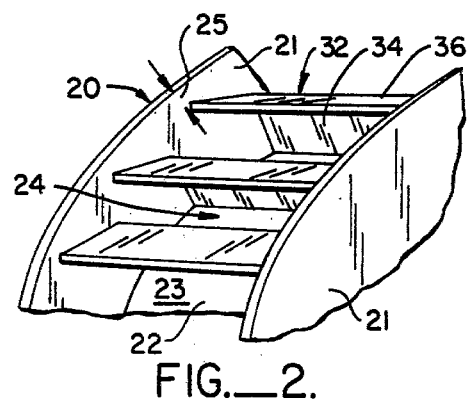
FIG._2.
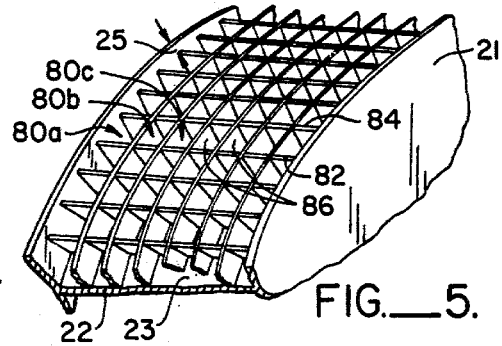
FIG._5.
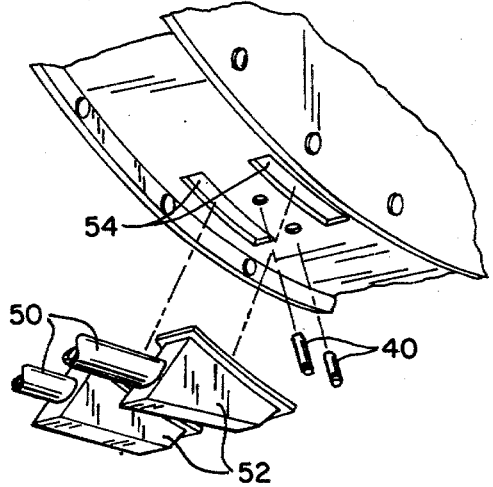
FIG._4.
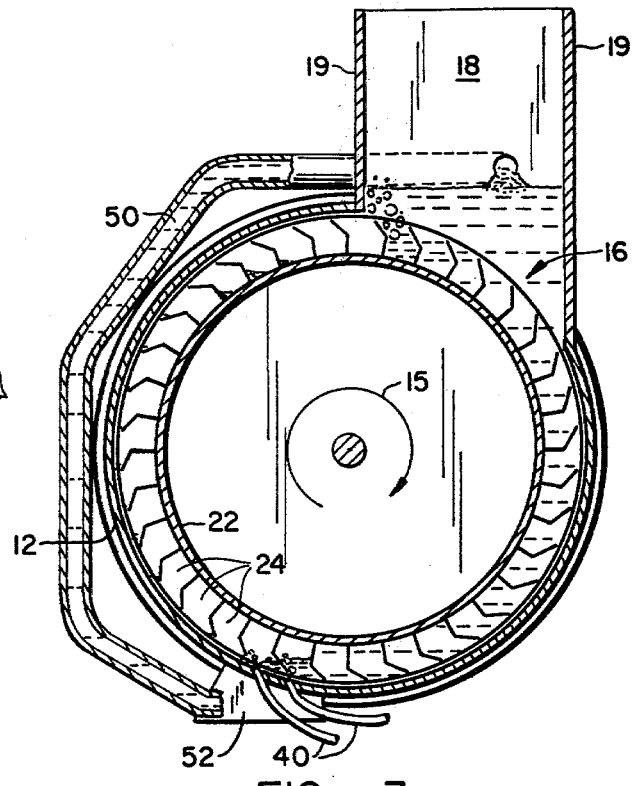
FIG._3.

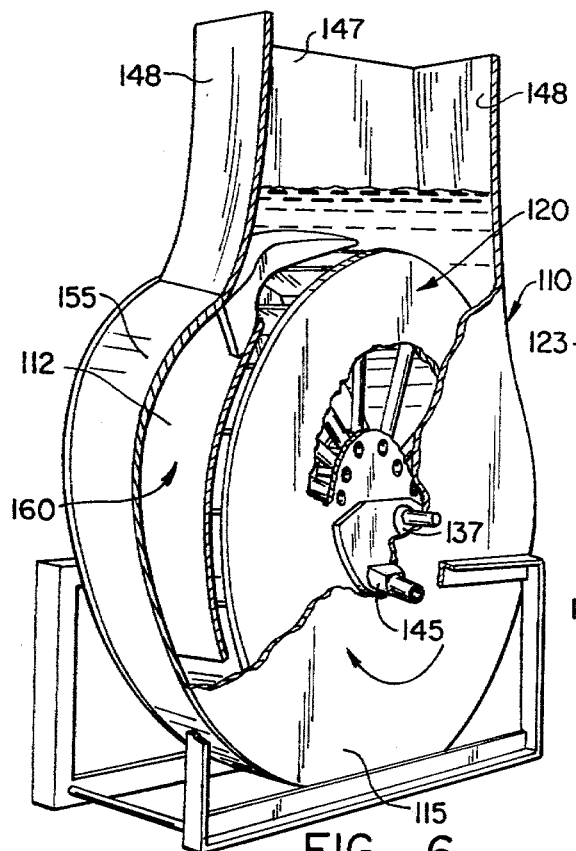
FIG._6.
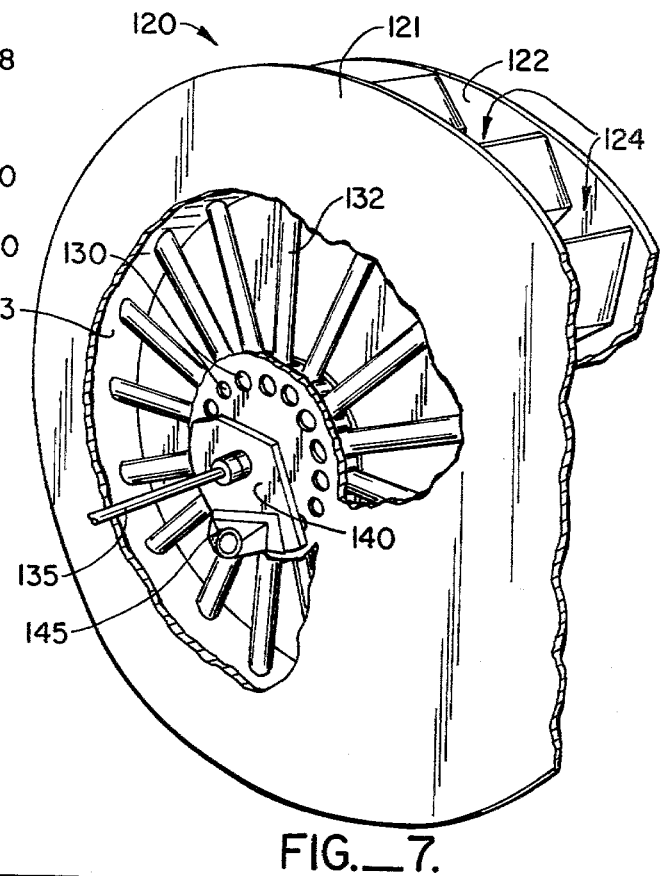
FIG._7.
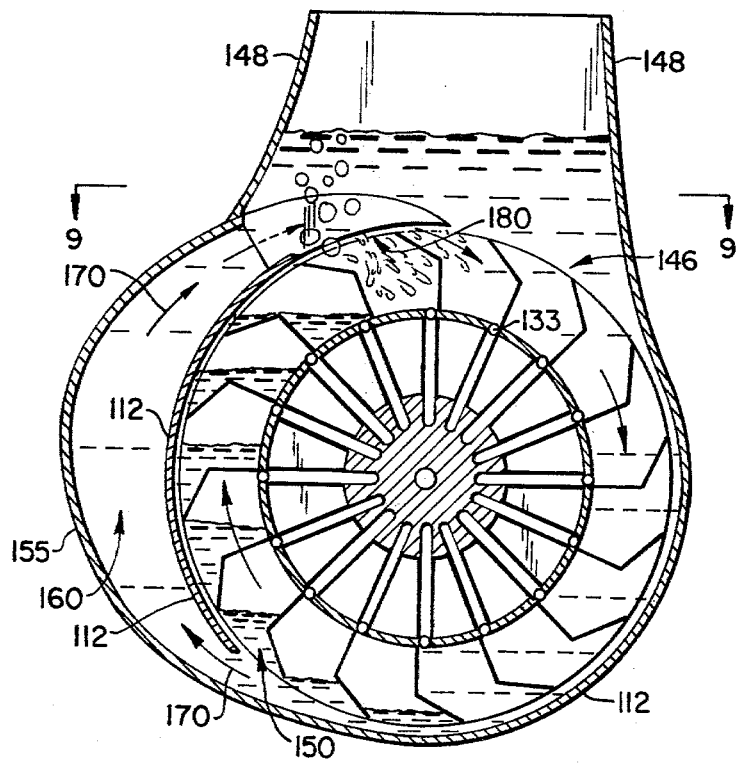
FIG._8.

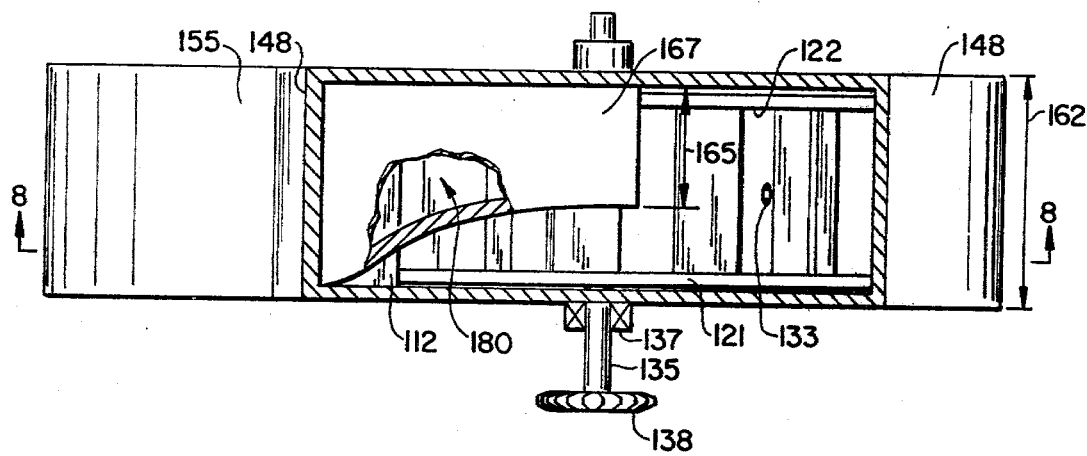
FIG._9.

RECIRCULATING SUBMERSIBLE TURBINE

This application is a continuation-in-part of application Ser. No. 857,635, filed Dec. 5, 1977, entitled RECIRCULATING SUBMERSIBLE TURBINE, now U.S. Pat. No. 4,170,114, issued Oct. 9, 1979.

This invention relates generally to fluid operated machines, and more specifically to a submersible turbine running on compressed gas.

BACKGROUND OF THE INVENTION

Submersible turbines running on compressed gas, typically air, are known. See for example U.S. Pat. No. 272,656 to Cook, U.S. Pat. No. 271,040 to Cook, and U.S. Pat. No. 211,143 to Fogarty. As turbines of this type run on low pressure gas, they are suitable for extracting energy from sources such as low pressure gas wells that are not otherwise useful. Moreover, such turbines are especially suited for use in environments where electric and combustion engines would be unsafe, as for example in the presence of explosive gases. The compressed air used to run the turbine may also be used to provide necessary ventilation. However, prior art devices have suffered from certain problems.

The submerged wheel is often provided with a housing that affords substantial clearance between the wheel and the housing. The relatively large housing relative to the wheel size results in an extremely heavy machine, possibly unsuitable for installation in existing structures, and further represents a substantial cost for material and fabrication.

This large clearance also results in the escape of air in the form of large bubbles that are released as the turbine wheel rotates. Once the air is clear of the turbine wheel, the upward motion of the air pocket is no longer available for driving the wheel. Moreover, as large amounts of water flow in to replace the air, large scale turbulence is created and extends to the surrounding water, thereby dissipating energy and reducing the efficiency. Local turbulence is also created, and produces undesirable vibrations of the turbine. As the upwardly moving air leaves the vicinity of the rotating turbine wheel, the inflowing water tends to replace the air in a relatively nondirectional manner. This inflow often acts in a direction opposite that in which the wheel is rotating, thereby producing vibration and a reduction of the energy output.

In order to increase the rotational range over which air is trapped in the chambers, backswept vanes are often used. However, this solution to one problem is itself the cause of other problems arising from the relatively closed configuration of the chambers. This manifests itself at the bottom of the wheel where gas that is injected must bubble up through the water in order to displace water downwardly out of the chamber, and at the top of the wheel where the gas must escape upwardly as water gravitationally fills the chamber. With the backswept vanes, additional resistance is encountered by the displaced water at the bottom and by the inflowing water at the top. Accordingly, it is not uncommon for turbines to operate with a considerable amount of air within the downwardly moving chambers on the wheel. This can occur either as a result of injected air's being unable to properly displace water from the lower chambers and thereby bubbling up the wrong side, or trapped air in the upper chambers being unable to escape quickly. In either case, the useful power that may be extracted from the turbine is reduced.

A further difficulty often encountered with prior art devices relate to loading on the axle bearings due to the weight of the wheel. Excessive loading leads to frictional losses and possible ultimate failure of the bearings themselves.

SUMMARY OF THE INVENTION

The present invention provides a submersible turbine characterized by orderly and efficient gas injection at the bottom and water replacement at the top to increase efficiency and reduce vibrations.

A turbine wheel is encased in a closely fitting cylindrical housing filled with water. The circumference of the wheel is fitted with a plurality of chambers defined by axially extending vanes, each of which may have a radially flat portion tending to propel water tangentially following the direction of rotation of the wheel. Each chamber communicates to a respective radial conduit, and through the conduit to a central manifold. Gas is supplied at the manifold, so rather than being injected from outside the wheel, the gas is injected into the chambers from a point radially inward of the chamber volume. The radial conduits may be provided with check valves to exclude water and prevent it from flowing into the manifold. The central manifold sequentially communicates the source of pressurized gas to the radial conduits so that each chamber is rapidly filled with gas as it passes the bottom dead center position. Water displaced downwardly out of the bottom chambers is diverted into a bypass conduit running outside the closely fitting housing and travels upwardly to be reintroduced into the chambers as they near the top dead center position. The water is preferably introduced over a fraction of the chambers' axial dimension so that the air may be quickly displaced to the side (axially). The housing is open in its upper portions and a wall surrounding the opening maintains a reservoir to aid in orderly replacement of water into the chambers and to permit the rapidly displaced air to escape.

It will be appreciated that the introduction of air from the top of the lower chambers provides for a surprisingly efficient unloading mechanism which minimizes any tendency of injected air to bubble up the downwardly moving portion of the wheel and which avoids problems of turbulence which would occur as the air was forced to bubble its way up through the chamber to displace water initially above it.

The water displaced by the injected gas circulates in the region between the ends of the vanes and the housing, but, due to the relatively small radial dimension of the clearance, a wheel having chambers significantly deeper than the dimension requires the external conduit. This configuration, especially with the axially narrowed reintroduction portion, provides extremely effective water replacement.

The present invention has the further surprising result that it provides means for treating effluent. Typically, treatment of sewage requires the introduction of air to oxidize solid material and destroy odors, and turbulent movement of the water to kill algae. By the expedient of running the turbine with minimal mechanical loading, the turbine wheel is caused to rotate too quickly to permit efficient air and water replacement. However, this condition is ideally suited for sewage treatment since the circulation occurs with a considerable amount of air mixed with the water.

For a further understanding of the nature and advantages of the present invention, reference should be had to the remaining portions of this specification and to the attached drawings.

BRIEF DESCRIPTION OF THE DRAWINGS

FIG. 1 is an overall perspective view of a turbine wherein air is injected beneath the wheel;

FIG. 2 is a fragmentary perspective view of the chambers located on the circumference of the turbine wheel;

FIG. 3 is a cross-sectional view of the turbine of FIG. 1 showing the relationship between the air injectors and the bypass conduit;

FIG. 4 is an exploded perspective view of the bottom portion of the housing showing the air injectors in the bypass conduit inlets;

FIG. 5 is a fragmentary perspective view of an alternate embodiment of the turbine wheel, especially adapted for use without a bypass conduit;

FIG. 6 is an overall perspective view, partially cut away, of a turbine according to the present invention;

FIG. 7 is a perspective view, partially cut away, of a preferred embodiment of the turbine wheel;

FIG. 8 is a cross-sectional view of the turbine of FIG. 6; and

FIG. 9 is a horizontal section showing the axially narrowed portion of the bypass conduit in elevation, partially cut away.

DESCRIPTION OF THE PREFERRED EMBODIMENT

FIG. 1 is a perspective view showing the major components of a turbine including a housing 10 and a wheel 20. Housing 10 includes circular side plates 11 spaced apart by a central cylindrical shell 12. Shell 12 carries annular flanges 14 welded thereto to allow shell 12 to be bolted to side plate 11. A neoprene gasket is interposed between flanges 14 and side plates 11 to provide a water-tight seal. An opening 16 extends across housing 10, with an axial dimension approximately equal to that of cylindrical shell 12. Opening 16 is surrounded by vertical sidewalls 18 parallel to plate 11 and vertical walls 19 perpendicular to side wall 18 to prevent water from overflowing out of opening 16. Opening 16 is generally confined to a region beyond top dead center (for convenience, displacements along the circumference of housing 10 or wheel 20 will be assumed to be along the direction of rotation of wheel 20 as shown by arrow 15.

FIG. 2 shows a preferred embodiment of wheel 20. Wheel 20 comprises paired wheel discs 21 and a cylindrical wheel shell 22 of lesser diameter located therebetween. Wheel discs 21 and cylindrical wheel shell 22 are welded together to provide a hollow, water-tight wheel core, and the outer surface 23 of wheel shell 22 partially defines a plurality of chambers 24. Steel of ⅛" thickness is suitable material. A shaft 26 extends axially in both directions from wheel 20 and is supported from side plates 11 by bearings 28. Wheel discs 21 have a diameter as close to the inner diameter of housing 10 as is practical. A typical clearance is ⅛" for a 48" diameter wheel. In the preferred embodiment, wheel discs 21 extend beyond cylindrical surface 23 by a distance corresponding to the depth of chambers 24 increased by a specified distance 25, typically ½", to provide a circulation region as will be described below.

Wheel discs 21 and wheel shell 22 provide the axial and radial bounds of chambers 24. Chambers 24 are bounded azimuthally by vanes 32, each of which has a radial portion 34 extending part of the distance from surface 23 to the outer edge of side plates 21, and a backswept portion 36 extending outward angularly from the end of straight portion 34 to within distance 25 of the circumference of discs 21. The vanes are made of a relatively thin material such as 1/16" iron, as compared to the relatively thicker material of wheel discs 21.

Referring to FIGS. 1, 3, and 4, air injectors 40 and bypass conduits 50 can be seen. Two air injectors 40 are centered axially on cylindrical shell 12 at circumferentially spaced positions past the bottom of the housing. Paired bypass conduits 50 are situated axially outward on either side of air injectors 40. Each bypass conduit 50 extends from a respective bypass inlet 52, up along the outside of housing 10 to a point above and beyond the top of housing 10 where it passes into a respective side wall 18. FIG. 4 is an exploded perspective view showing the arrangement of injectors 40, bypass conduits 50, and bypass inlets 52. Each bypass inlet 52 covers an opening 54 in cylindrical shell 12. The entire assembly is supported in a stand 76 which also prevents side plates 11 from bowing out relative to one another due to water pressure within the housing. A drain 78 is provided for emptying the housing of water.

Having set forth the construction of the turbine, the operation may be described. In use, housing 10 is filled with water while cylindrical core 22 is filled with air. This allows a relatively small volume of water to be used, and further provides a buoyant force on wheel 20 so as to relieve the downward loading on bearings 28. When air, as for example, from a compressor, is injected through air injectors 40, it begins to fill those chambers 24 nearest the injectors. Water displaced by the injected air flows into intake conduit 52 and through bypass conduit 50. The buoyant force acting on this trapped air in chambers 24 causes the wheel to rotate in the direction of arrow 15. As the wheel rotates, the air filled chambers, upon nearing the top of the wheel, are facing upward and release their air. The released air is replaced by water contained by walls 18 and 19 and the water from bypass conduit 50.

Not all of the water displaced by the injected air passes through conduits 50. Rather, some of it circulates upward in the region bounded radially by the ends of vanes 32 and the inner surface of cylindrical shell 12, and axially by the radially outermost portions of wheel discs 21. This volume is provided primarily by clearance dimension 25. Due to the small clearance between wheel 20 and housing 10, chambers 24 on the upwardly moving side of the wheel tends to remain filled with air until they reach the top of the wheel. Since they are moving in a region substantially free of water, they are essentially free of viscous drag. The vanes, each with a flat radial portion, tend to propel the water forward in a tangential manner following the rotation of the wheel in order to set up an overall circulation of the water. On the downwardly moving side, the circulation is maintained by having the water filled chambers being propelled forward by the wheel. On the upwardly moving side, the water has been displaced into bypass conduit 50 and into the peripheral region of the housing where it flows smoothly.

FIG. 5 is a fragmentary prospective view of an embodiment of the turbine wheel suitable for use in a turbine when housing is not provided with a bypass conduit. Rather than having a single chamber extending axially across the wheel, a plurality of smaller abutting chambers is provided. A given axial row of chambers, including chambers 80a, 80b, and 80c, is defined by radial vanes 82 and 84, a plurality of annular segments 86, and outer core surface 23. The entire wheel circumference includes a plurality of abutting axial rows of this sort. Vanes 82 and 84, and annular segments 86, are preferably thin material such as 1/16" galvanized steel.

Chambers 80a, 80b, and 80c have dimensions that are small compared to the wheel diameter, and so are approximately rectangular. When such a wheel is used, an air injection manifold must be provided with an injector corresponding to each chamber in a given axial row. Since no bypass conduit is provided, the turbine of this embodiment relies on setting up the circulation of water in the outermost peripheral region of housing 10. The water in this region tends to be moving faster than the wheel in order to maintain the circulation. The use of multiple chambers in a given axial row works to eliminate sideways turbulence of water which would tend to displace air prematurely up along circular side discs 21 of the wheel.

FIG. 6 is a perspective view, partially cut away, showing a further embodiment of the present invention that is characterized by especially orderly and efficient gas injection at the bottom and water replacement at the top. As with the embodiment described above, a watertight housing 110 contains a submerged wheel 120. Housing 110 is defined by a cylindrical shell 112 and paired sidewalls 115. Referring also to FIG. 7, wheel 120 is of similar construction to wheel 20 of FIG. 2. In particular, concentric circular side discs 121 and 122 are spaced apart by a cylindrical shell 123 of a lesser diameter to define a central hollow core and an outer chamber region having a plurality of chambers 124 corresponding in configuration to chambers 24 of FIG. 2.

Disc 121 has a plurality of apertures 130 corresponding to the plurality of chambers 124 and disposed in a circular array at a position radially inward from shell 123. Each aperture 130 communicates to a respective peripheral chamber 124 via a generally radial conduit 132 located within the cylindrical core defined by discs 121 and 122 and cylindrical shell 123. Each conduit 132 has a check valve 133 to permit radially outward flow but block radially inward flow.

A rigid shaft 135 is connected coaxially to wheel 120 and is supported by suitable bearings 137 mounted to housing 110. Shaft 135 carries a sprocket 138 or other suitable means for extracting the mechanical output. A distribution plate 140 is rotatably mounted about shaft 135 and covers at least some of apertures 130, typically subtending an angle in the neighborhood of 100° to 120°. Plate 140 remains generally stationary as wheel 120 rotates and covers those of apertures 130 that are in a position from somewhat before bottom dead center to approximately 90° past bottom dead center. A gas inlet conduit 145 overlies an opening in distribution plate 140, the opening subtending an angle suitable for communicating simultaneously with two adjacent ones of apertures 130.

Plate 140 bears against disc 121 to provide a sliding seal. Suitable pressure may be maintained by any suitable means, as for example, by compression springs acting between plate 140 and the nearest sidewall of housing 110.

Cylindrical housing shell 112 is of only slightly greater diameter than wheel discs 121 and 122 so that housing 110 is sized to fit around wheel 120 with minimal radial clearance. Cylindrical housing shell 112 has a first opening 146 at its top, which opening is surrounded by upwardly extending walls 147 that are extensions of housing sidewalls 115 and upwardly extending walls 148 perpendicular to walls 147 to define a reservoir surrounding upper opening 146. Cylindrical shell 112 has a second opening 150 in its lower portions, extending from approximately bottom dead center to a position approximately 45° beyond bottom dead center. An outer generally semi-cylindrical wall 155 spaced radially outward from housing shell 112 cooperates with the portion of housing shell 112 past bottom dead center and horizontal extensions of housing sidewalls 115 to define a bypass conduit 160 that communicates with opening 150 at its lower end and with a portion of opening 146 at its upper end.

Openings 146 and 150 are characterized by an axial dimension 162 generally commensurate with wheel 120. Conduit 160 is correspondingly dimensioned axially for most of its extent, but in its upper portions, as can be best seen in FIG. 9, conduit 160 tapers to an axial dimension 165 that is narrower than axial dimension 162. Thus, as bypass conduit 160 communicates to upper housing opening 146, it communicates downwardly over a narrowed axial dimension and over a circumferential fraction of upper housing opening 146. Thus, with reference to the top plan view of FIG. 9, bypass conduit 160 provides a downardly facing opening 180 that overlies an axial portion of wheel 120 as it rotates thereunder.

Having described the structure of the embodiment of FIGS. 6-9, the operation may be understood. As with the previous embodiments, gas such as compressed air is introduced into chambers 124 as they pass the lowermost position and buoyant lift causes rotation of the wheel. With respect to the embodiment of FIGS. 6-9, however, the introduction of compressed gas is through inlet conduit 145 so that the gas is introduced into a radially innermost region of each chamber. Therefore, water is displaced downwardly without the gas having to bubble upwardly through the water. As the wheel rotates, different apertures 130 come into communication with inlet conduit 145. Water that is displaced downwardly by the introduction of gas from the radially innermost region of the chamber flows through opening 150 into bypass conduit 160 and the displaced water circulates upward in the direction of arrows 170. At the top of the water's travel within bypass conduit 160, the water passes into narrowed conduit portion 167 and downwardly through opening 180 into the underlying chambers passing thereby. The downwardly flowing water displaces air out of the chamber in an axially sideways fashion, which displaced air bubbles upwardly over the remaining axial width of upper opening 146. Check valves 133, while allowing the pressurized gas to enter the chambers at the bottom assume a seated position so that water in the chambers cannot flow downwardly through the respective conduits.

The turbine embodiments described above may also be used in a different, apparently less efficient mode by allowing the wheel to rotate at a speed faster than that which will permit efficient replacement of air and water. This may be accomplished by providing more air than normally is required or by not loading the output. The result is that the circulating water carries with it a great deal of air which oxidizes organic solids and destroys odors. At the same time, the circulation kills algae in the water. Thus, the present invention provides a method and means for treating sewage by aeration.

In summary it can be seen that the present invention provides a submersible turbine characterized by efficient and orderly liquid and gas replacement to minimize turbulence and vibration. While the above provides a full and complete disclosure of the preferred embodiments of the invention, various modifications, alternate constructions, and equivalents may be employed without departing from the true spirit and scope of the invention. For example, apertures 130 and distribution plate 140 are located relatively close to shaft 135. While this configuration tends to minimize drag on the wheel caused by the sliding seal between plate 140 and wheel 120, the apertures and distribution plate could be situated at a greater radial separation from the shaft. Therefore, the above description and illustrations should not be construed as limiting the scope of the invention which is defined by the appended claims.

What is claimed is:

1. In a turbine having a wheel with a plurality of chambers on its periphery, the wheel being submerged in liquid, wherein gas trapped in chambers on one side of the wheel provides buoyant lift to those chambers causing the wheel to rotate, the improvement comprising:
means defining a plurality of radial conduits corresponding to said plurality of chambers, each said radial conduit being communicated to a radially innermost portion of a corresponding chamber;
means for sequentially communicating a source of pressurized gas to said conduits when the chamber corresponding to each of said conduits is disposed within a predetermined angular portion of the rotation of said wheel.

2. In a turbine having a wheel with a plurality of chambers on its periphery, the wheel being submerged in liquid, wherein gas trapped in chambers on one side of the wheel provides buoyant lift to those chambers, thereby causing the wheel to rotate, the improvement comprising:
means defining a plurality of conduits corresponding to said plurality of chambers, each said conduit being communicated to a portion of a corresponding chamber that is generally proximate the radially inward extreme of said chamber; and
means for sequentially communicating a source of pressurized gas to said conduits wherein a particular conduit receives gas when the chamber corresponding to said particular conduit is within a first angular range generally proximate its lowermost position.

3. The invention of claim 2 also comprising:
housing means defining a radially narrow clearance beyond the radially outermost portion of said wheel and said housing means over a second angular range;
bypass conduit means exterior of said housing having a first end in fluid communication with said wheel over said first angular range and a second end in fluid communication with said wheel proximate an upper portion of its rotation for receiving liquid displaced from lower chambers by said pressurized gas and reintroducing said liquid into said chambers proximate the uppermost portion of their travel.

4. The invention of claim 3 wherein said second end of said bypass conduit means has an axial dimension that is narrower than the axial dimension of said chambers so that gas in said chambers is displaced axially sideways.

5. The invention of claim 2 wherein said wheel includes a cylindrically symmetric hollow portion for providing buoyancy to neutralize the weight of said wheel and thereby reduce axle loading.

6. The invention of claim 2 wherein said chambers are in part defined by a corresponding plurality of vanes, each of which has a flat portion perpendicular to the outer surface of the wheel to promote circulation of at least a portion of said liquid in the region radially outward of said wheel and proximate thereto.

7. In a turbine having a wheel with a plurality of chambers on its periphery, the wheel being submerged in liquid, wherein gas trapped in chambers on one side of the wheel provides buoyant lift to those chambers, thereby causing the wheel to rotate, the improvement comprising:
housing means defining a radially narrow clearance between the radially outermost portion of said wheel and said housing means;
bypass conduit means exterior of said housing and having a first lower end in communication with said wheel over the entire axial dimension of said chambers, and a second upper end in communication with said wheel over a portion of said chambers' axial dimension, said bypass conduit means receiving liquid displaced from said chambers by said pressurized gas when they are at a low position and reintroducing said liquid into said chambers when they are at a high position over a portion of said axial dimension of said chambers to displace gas axially sideways and promote efficient replacement of liquid.

* * * * *